(12) United States Patent
Sugaya et al.

(10) Patent No.: US 8,615,167 B2
(45) Date of Patent: Dec. 24, 2013

(54) WDM OPTICAL TRANSMISSION SYSTEM AND CONTROL METHOD THEREOF

(75) Inventors: Yasushi Sugaya, Kawasaki (JP); Takehiro Fujita, Kawasaki (JP); Satoru Okano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 13/230,048

(22) Filed: Sep. 12, 2011

(65) Prior Publication Data

US 2012/0063771 A1    Mar. 15, 2012

(30) Foreign Application Priority Data

Sep. 15, 2010  (JP) ................................ 2010-206257

(51) Int. Cl.
  *H04B 10/08*  (2011.01)
  *H04J 14/02*  (2006.01)

(52) U.S. Cl.
  USPC .................... 398/26; 398/30; 398/33; 398/94

(58) Field of Classification Search
  USPC ............. 398/79, 83, 173–181, 26, 30, 33, 94
  See application file for complete search history.

(56) References Cited

U.S. PATENT DOCUMENTS

| | | | |
|---|---|---|---|
| 5,225,922 A * | 7/1993 | Chraplyvy et al. ............. | 398/94 |
| 5,790,289 A | 8/1998 | Taga et al. | |
| 6,040,933 A * | 3/2000 | Khaleghi et al. .................. | 398/1 |
| 6,219,162 B1 * | 4/2001 | Barnard et al. .................... | 398/9 |
| 6,654,561 B1 | 11/2003 | Terahara et al. | |
| 6,697,577 B1 * | 2/2004 | Li et al. .......................... | 398/202 |
| 6,735,725 B1 * | 5/2004 | Wu et al. ........................ | 714/704 |
| 6,819,479 B1 * | 11/2004 | Islam et al. ..................... | 359/337 |
| 6,934,479 B2 * | 8/2005 | Sakamoto et al. ............. | 398/193 |
| 7,522,746 B2 * | 4/2009 | Rhee ............................. | 382/103 |
| 7,522,846 B1 * | 4/2009 | Lewis et al. ..................... | 398/197 |
| 7,619,813 B2 * | 11/2009 | Maeda et al. ............. | 359/341.42 |
| 7,689,131 B2 * | 3/2010 | Uekama et al. ................ | 398/181 |
| 7,773,886 B2 * | 8/2010 | Hainberger et al. ............. | 398/97 |
| 7,899,331 B2 * | 3/2011 | Itoh et al. ......................... | 398/97 |
| 8,045,852 B2 * | 10/2011 | Butler et al. ..................... | 398/27 |
| 8,086,106 B2 * | 12/2011 | Nakamura ....................... | 398/79 |
| 2003/0152388 A1 * | 8/2003 | Uda et al. ......................... | 398/97 |
| 2008/0131116 A1 * | 6/2008 | Nakamura ........................ | 398/34 |
| 2009/0129770 A1 * | 5/2009 | Oohashi et al. .................... | 398/1 |
| 2009/0136233 A1 * | 5/2009 | Fukashiro ...................... | 398/128 |
| 2010/0158532 A1 * | 6/2010 | Goto et al. ....................... | 398/81 |

FOREIGN PATENT DOCUMENTS

| | | |
|---|---|---|
| JP | 8-321824 A | 12/1996 |
| JP | 2001-203414 A | 7/2001 |

* cited by examiner

*Primary Examiner* — Ken Vanderpuye
*Assistant Examiner* — Dibson Sanchez
(74) *Attorney, Agent, or Firm* — Fujitsu Patent Center

(57) ABSTRACT

A WDM optical transmission system includes a plurality of optical nodes optically coupled by a transmission line, a processor that is operative to calculate an amount of adjustment of a reception level capable of increasing an optical signal-to-noise ratio for each channel of the WDM light reaching the optical node positioned at a receiving end of the unit section based on information on amplification operation of the WDM light in at least one optical-amplification repeating node disposed on the optical transmission line in the unit section, and to adjust a power level corresponding to each channel of the WDM light transmitted on the transmission line from the optical node positioned at a transmission end of the unit section in accordance with a calculation result of the calculation.

11 Claims, 8 Drawing Sheets

WDM OPTICAL TRANSMISSION SYSTEM AND CONTROL METHOD THEREOF

CROSS-REFERENCE TO RELATED APPLICATIONS

This application is based upon and claims the benefit of priority of the prior Japanese Patent Application No. 2010-206257, filed on Sep. 15, 2010, the entire contents of which are incorporated herein by reference.

FIELD

The disclosure herein relates to a WDM optical transmission system performing repeated transmission of WDM (Wavelength Division Multiplexing) light while amplifying the light, and a method of controlling the WDM optical transmission system.

BACKGROUND

In a WDM optical transmission system applied to long-distance trunk lines, optical amplification repeaters are connected in multiple stages in order to achieve low-cost and low-noise optical transmission. Each of the optical amplification repeaters usually includes a simple optical amplifier, and generally does not include a wavelength-deviation compensator capable of independently adjusting a power level corresponding to signal light of each wavelength (a channel) included in WDM light. Accordingly, level deviations among channels that occur in the WDM light in accordance with gain-wavelength characteristics of the optical amplification repeaters are accumulated in accordance with the number of stages of the optical amplification repeaters. Accordingly, a phenomenon occurs in which an optical signal-to-noise ratio (OSNR) deteriorates on a channel having a relatively low power level among a plurality of channels of the WDM light that reaches a receiving end. In this regard, a power level of a received optical signal is sometimes called a "reception level". Also, an OSNR of a received optical signal is sometimes called a "received OSNR".

FIG. 1 is a schematic diagram illustrating a state in which level deviations of the above-described WDM light among channels are accumulated in accordance with the number of repeated stages. An upper side of FIG. 1 illustrates an example of a configuration of a trunk-line WDM optical transmission system in which WDM light output from a transmission terminal station 101 is transmitted to a receiving terminal station 102 while being amplified by a plurality of optical amplification repeaters 104 disposed on an optical transmission line 103 at necessary intervals. Also, a lower side of FIG. 1 illustrates level deviations among channels of WDM light at each position along that system.

In FIG. 1, it is assumed that each optical amplification repeater 104 disposed between the transmission terminal station 101 and the receiving terminal station 102 is constructed using a simple optical amplifier which does not have a function of an OADM (Optical Add Drop Multiplexer) node that adds or drops a specific channel to or from WDM light transmitted on the optical transmission line 103, and a function that can independently adjust a power level corresponding to each channel. In this case, WDM light with a same level of each channel power, which is output from the transmission terminal station 101, is amplified by a first-stage optical amplification repeater 104 so that differences arise in each channel power depending on individual gain-wavelength characteristics. Accordingly, WDM light given at an input end al of an optical transmission line 103 of a first repeater span connected to the first-stage optical amplification repeater 104 has a wavelength deviation corresponding to a difference between a maximum power level corresponding to a channel indicated by a broken line and a minimum power level corresponding to a channel indicated by a chain-dotted line in the lower side of FIG. 1. In this regard, a bold solid line in the lower side of FIG. 1 denotes an average power level of individual channels of the WDM light.

The WDM light transmitted to the first repeater span reaches an output end b1 of the first repeater span while being attenuated in accordance with a loss characteristic of the optical transmission line 103, and is amplified by the second-stage optical amplification repeater 104. In the second-stage optical amplification repeater 104, differences occur in power of individual channels in accordance with the gain-wavelength characteristic in the same manner as the case of the first-stage optical amplification repeater 104. Accordingly, WDM light given at an input end a2 of a second repeater-span optical transmission line 103 has a wavelength deviation produced by accumulating the wavelength deviations individually occurring in the first-stage and the second-stage optical amplification repeaters 104. In the same manner as described above, wavelength deviations that occur by individual optical amplification repeaters 104 of a third stage and thereafter are accumulated in sequence so that WDM light that reaches the receiving terminal station 102 has enlarged level deviations among channels as shown by the right end of the lower part of FIG. 1. Among a plurality of channels included in the WDM light, for channels that have a relatively low power level, a ratio of the signal component to the noise component, which is accumulated ASE, etc., that occurred in the individual optical amplification repeaters 104, is decreased, and thus the above-described deterioration of OSNR becomes problematic.

A related-art technique for suppressing deterioration of an OSNR caused by accumulation of level deviations of WDM light among channels as described above is described. For example, a technique is provided for performing pre-emphasis on the basis of measurement results of the OSNR as described in a patent document, Japanese Laid-open Patent Publication No. 8-321824, etc. Specifically, as shown in FIG. 2, in the above-described technique, an OSNR monitor 105 is disposed at a receiving terminal station 102, and a power level of each channel transmitted from a transmission terminal station 101 is optimized by a pre-emphasis control circuit 106 so as to maximize an OSNR of each channel measured by the OSNR monitor 105.

However, the above-described related-art technique has a drawback in that it becomes necessary to provide an expensive device, such as an optical spectrum analyzer, etc., as the OSNR monitor 105. Also, as shown by a dotted line in FIG. 2, in the case of a system configuration in which an OADM node 107 is disposed on an optical transmission line 103 between the transmission terminal station 101 and the receiving terminal station 102, a lot of transmission and reception sections (wavelength paths) corresponding to each channel of WDM light may be provided. In this case, if pre-emphasis is to be optimized for each of the transmission and reception sections, there is the possibility that an optimum solution thereof cannot be found.

On the problem of the related-art technique described above, for example, a patent document, Japanese Laid-open Patent Publication No. 2001-203414 has proposed a technique in which predetermined physical quantities at a plurality of stations on an optical transmission line are obtained in place of measuring a level of amplified spontaneous emission (ASE) noise included in WDM light using an optical spectrum analyzer, etc., an OSNR corresponding to each channel at a receiving end is calculated on the basis of the physical quantities, and pre-emphasis is performed so that the OSNR at each of the channels becomes equal with each other. In this technique, when an OADM node is disposed between the transmission end and the receiving end, it is made possible to optimize pre-emphasis corresponding to each channel of WDM light by making path groups which gather channels having same transmission/receiving sections, performing pre-emphasis among the individual path groups, and then performing pre-emphasis for each of the path groups.

However, in the above-described related-art technique, if the number of OADM nodes disposed between the transmission end and the receiving end increases, the transmission/receiving sections corresponding to individual channels of WDM light have a large variety of paths. Accordingly, calculation of OSNRs corresponding to the individual transmission/receiving sections and adjustment of transmission light level become complicated, and thus there is a problem in that it is not easy to achieve the technique. Also, if pre-emphasis is performed so that an OSNR of each channel at a receiving end becomes equal, level differences among channels at the transmission end sometimes become considerably large. It is possible that such a large wavelength deviation of WDM light at transmission end has an adverse effect on transmission characteristics other than the OSNR.

SUMMARY

According to an aspect of the disclosed embodiments, a WDM optical transmission system includes a plurality of optical nodes optically coupled by a transmission line, and a processor that is operative to set a section coupling two adjacent optical nodes among the plurality of optical nodes as a unit section for control, to control the power level corresponding to each channel of the WDM light for each of the unit section, to calculate an amount of adjustment of a reception level capable of increasing an optical signal-to-noise ratio for each channel of the WDM light reaching the optical node positioned at a receiving end of the unit section based on information on amplification operation of the WDM light in at least one optical-amplification repeating node disposed on the optical transmission line in the unit section, and to adjust a power level corresponding to each channel of the WDM light transmitted on the transmission line from the optical node positioned at a transmission end of the unit section in accordance with a calculation result of the calculation.

The object and advantages of the disclosed embodiments will be realized and attained by at least the features, elements, and combinations particularly pointed out in the claims.

It is to be understood that both the foregoing general description and the following detailed description are exemplary and explanatory and are not restrictive of the disclosed embodiments, as claimed.

DESCRIPTION OF EMBODIMENTS

In the following, detailed descriptions will be given of embodiments of the present invention with reference to the drawings.

Figure 1:
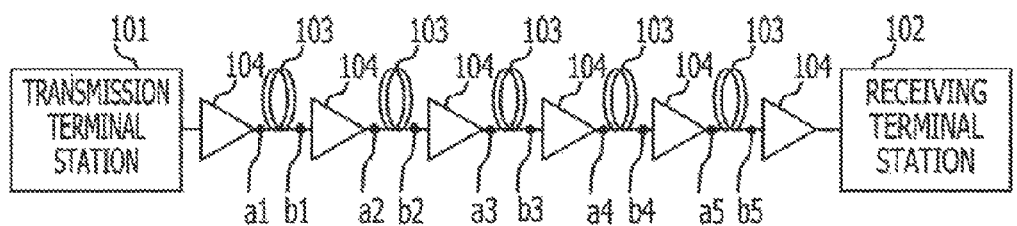
FIG. 1 is a schematic diagram illustrating a state in which level deviations among channels are accumulated in accordance with the number of repeated stages for a general trunk-line WDM optical transmission system.
Figure 1:
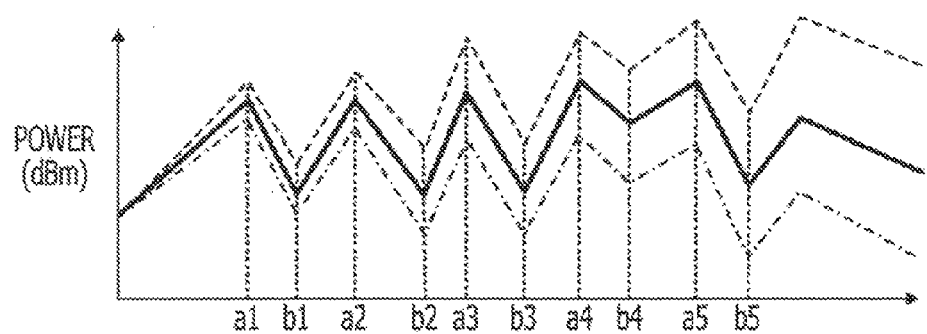
Figure 2:
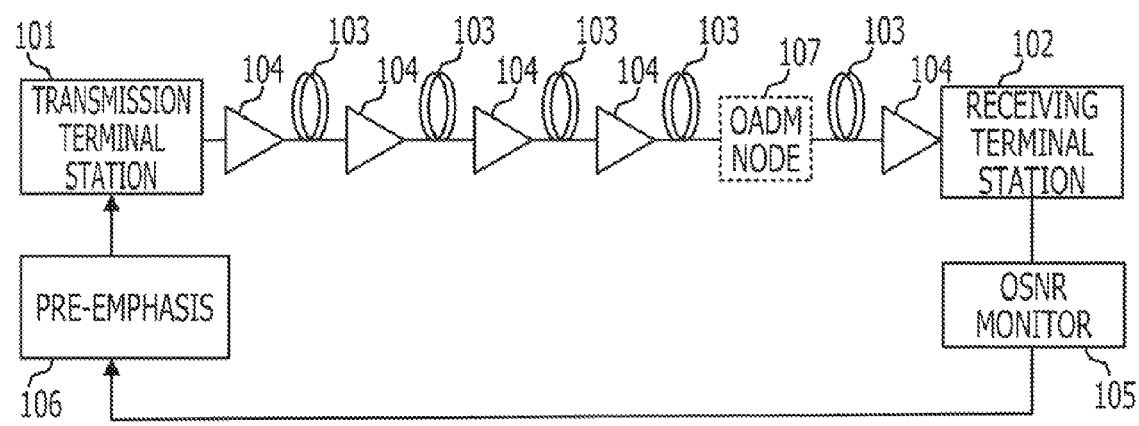
FIG. 2 is a block diagram illustrating an example of a configuration of a related-art WDM optical transmission system performing pre-emphasis on the basis of OSNR measurement results.
Figure 3:
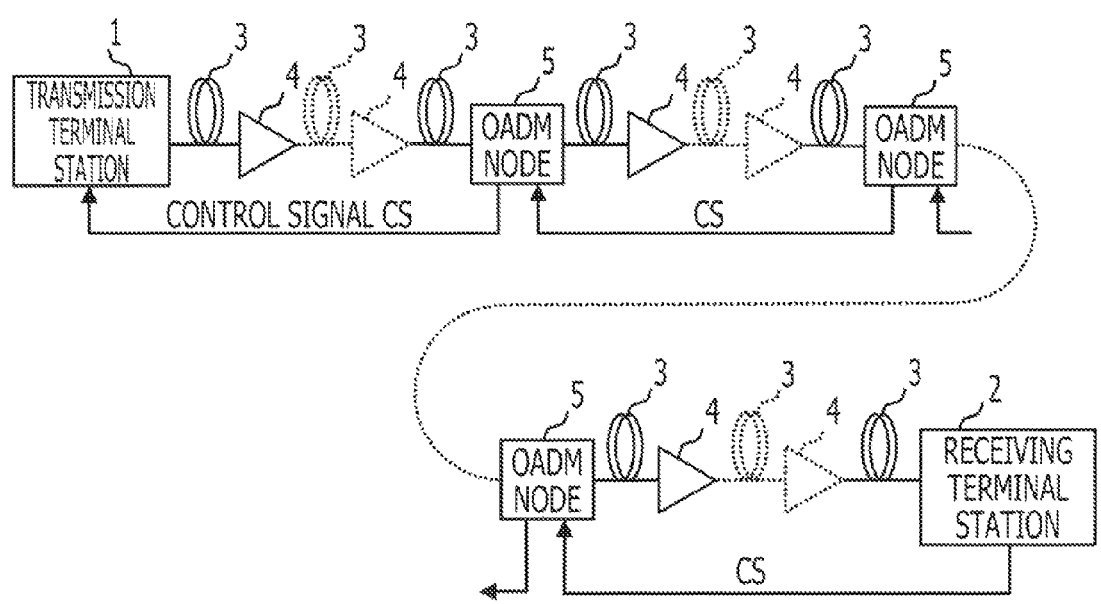
FIG. 3 is a block diagram illustrating an overall configuration of a WDM optical transmission system according to an embodiment of the present invention.

FIG. 3 is a block diagram illustrating an overall configuration of a WDM optical transmission system according to an embodiment of the present invention.

In FIG. 3, the WDM optical transmission system according to the present embodiment includes, for example, a plurality of optical-amplification repeating nodes 4 and a plurality of OADM nodes 5 on an optical transmission line 3 connecting a transmission terminal station 1 and a receiving terminal station 2. In this WDM optical transmission system, for an optical node having a function of independently adjusting a power level corresponding to each channel of WDM light, assuming that a section connecting two adjacent optical nodes as one unit, optimization is performed on a power level corresponding to each channel of WDM light transmitted through the unit section. Here, the above-described optimization of the power levels is individually performed on a section connecting the transmission terminal station 1 and an OADM node 5 positioned at an uppermost stream among the plurality of OADM nodes 5, a section connecting two adjacent OADM nodes 5 among the plurality of OADM nodes 5, and a section connecting an OADM node 5 positioned at an lowermost stream among the plurality of OADM nodes 5 and the receiving terminal station 2. In this regard, it is assumed that the optical nodes include the transmission terminal station and the receiving terminal station.

Figure 4:
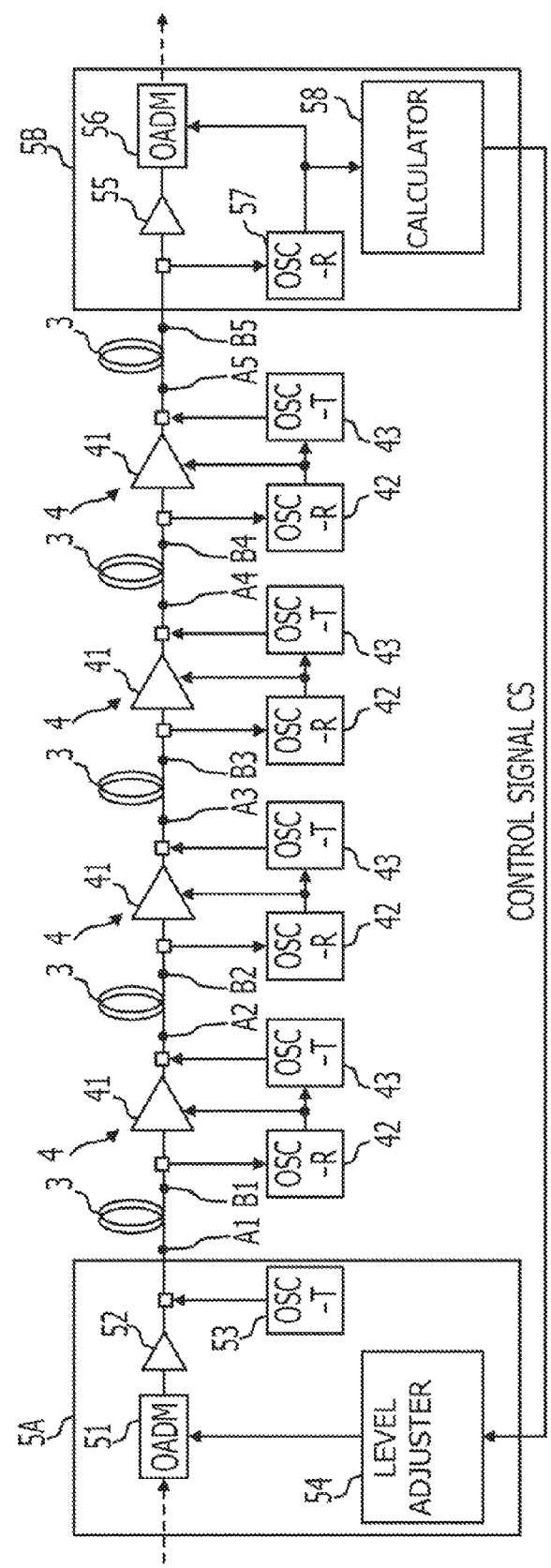
FIG. 4 is a block diagram illustrating an enlarged configuration of a section connecting two adjacent OADM nodes in the embodiment.

FIG. 4 is a block diagram illustrating an enlarged configuration of a section connecting the two adjacent OADM nodes 5 as a specific example of a unit section in which the above-described optimization of power level is performed.

In the example of the configuration in FIG. 4, an OADM node 5A, positioned at a transmission end of the unit section, includes an optical add/drop multiplexer (OADM) 51, a post amplifier 52, an optical supervisory channel (OSC) transmitter (OSC-T) 53, and a level adjuster 54. Also, an OADM node 5B positioned at a receiving end of the unit section includes a preamplifier 55, an optical add/drop multiplexer (OADM) 56, an OSC receiver (OSC-R) 57, and a calculator 58. The OADM node 5A includes a processor. The level adjusting and the calculating is performed by a processor.

A plurality of optical-amplification repeating nodes 4 are disposed at intervals on an optical transmission line 3 connecting each of the above-described OADM nodes 5A and 5B. Each of the optical-amplification repeating nodes 4 includes an optical amplification repeater 41 not having a function of independently adjusting a power level corresponding to each channel of input WDM light, an OSC receiver (OSC-R) 42 receiving an optical supervisory channel signal transmitted from an upstream side together with WDM light, and an OSC transmitter (OSC-T) 43 adding information on amplification operation of WDM light by that node to the optical supervisory channel signal received by the OSC receiver 42 and transmitting the signal to a downstream side.

The optical add/drop multiplexer 51 in the transmission-end side OADM node 5A includes a publicly-known optical device having a function of demultiplexing WDM light transmitted from an upstream node through the optical transmission line 3 into drop light to be branched at the own node, and a function of multiplexing add light onto the optical transmission line 3 from the own node. The optical add/drop multiplexer 51 has a function of independently adjusting a power level corresponding to each channel of WDM light transmitted onto the optical transmission line 3 toward a downstream node using a wavelength selective switch (WSS) not shown in the figure or a variable optical attenuator, etc., disposed for each channel. Here, an amount of adjustment for a power level of each channel in the optical add/drop multiplexer 51 is controlled in accordance with an output signal from the level adjuster 54. The WDM light processed by the optical add/drop multiplexer 51 is amplified by the post amplifier 52 together for each channel, and is transmitted to the optical transmission line 3. Also, the optical supervisory channel output from the OSC transmitter 53 is multiplexed onto the WDM light transmitted onto the optical transmission line 3. The optical supervisory channel includes information on a system operation state, and signal for transmitting channel information of WDM light transmitted from the OADM node 5A onto the optical transmission line 3 and total power, etc., to a downstream node.

The OSC receiver 42 in each optical-amplification repeating node 4 performs receiving processing of the optical supervisory channel demultiplexed from input light onto the node so as to obtain information transferred from the upstream node, and outputs the information to the optical amplification repeater 41 and the OSC transmitter 43. The optical amplification repeater 41 amplifies input WDM light together by a gain on the basis of the information obtained by the OSC receiver 42 and measurement results of an input/output power monitor (not shown). The OSC transmitter 43 generates an optical supervisory channel including the transmission information from the upstream node obtained by the OSC receiver 42 and additional information of measurement results by the input/output power monitor at the optical amplification repeater 41 of the own node. The optical supervisory channel generated by the OSC transmitter 43 is multiplexed onto the WDM light that has been amplified together by the optical amplification repeater 41, and is transmitted onto the optical transmission line 3.

The preamplifier 55 in the receiving-end side OADM node 5B amplifies WDM light transmitted from an upstream optical-amplification repeating node 4 through the optical transmission line 3 all together to a desired and/or necessary level, and outputs the WDM light to the optical add/drop multiplexer 56. The optical add/drop multiplexer 56 has a same configuration as that of the optical add/drop multiplexer 51 in the above-described transmission-end side OADM node 5A, and has a function of demultiplexing WDM light into drop light to be branched at the own node, a function of multiplexing add light onto the optical transmission line 3 from the own node, and a function of independently adjusting a power level corresponding to each channel of WDM light to be transmitted onto the optical transmission line 3 toward a lower node. The OSC receiver 57 performs receiving processing on the optical supervisory channel demultiplexed from the input light to the OADM node 5B so as to obtain the information transmitted from each node of an upstream, and outputs the information to the optical add/drop multiplexer 56 and the calculator 58. The calculator 58 calculates an amount of adjustment of a reception level capable of increasing a received OSNR of receiving light for each channel of WDM light reaching the OADM node 5B on the basis of the transmission information from the upstream each node obtained by the OSC receiver 57, and transmits a control signal CS indicating the calculation result to the level adjuster 54 in the transmission-end side OADM node 5A.

Here, a detailed description will be given of the calculation processing of the above-described calculator 58.

The calculator 58 calculates, first, a transmission line loss of each repeater span in a control unit section having the individual OADM nodes 5A and 5B as both ends using the output information from the OSC receiver 57. Specifically, a transmission line loss of a first repeater span, which is a section between the transmission-end side OADM node 5A and the first-stage optical-amplification repeating node 4, is obtained as a difference between total power of output WDM light from the OADM node 5A and total power of input WDM light to the first-stage optical-amplification repeating node 4, which are included in the output information from the OSC receiver 57. Also, a transmission line loss of a second repeater span, which is a section between the first and the second optical-amplification repeating nodes 4, is obtained as a difference between total power of output WDM light from the first-stage optical-amplification repeating node 4 and total power of input WDM light to the second-stage optical-amplification repeating node 4, which are included in the output information from the OSC receiver 57. After that, in the same manner as described above, transmission line losses of the individual repeater spans up to the receiving-end side OADM node 5B are individually calculated.

Next, the calculator 58 calculates a noise figure (NF) of the optical amplification repeater 41 in the optical-amplification repeating node 4 of each stage. In the calculation of the noise figure, for example, a table indicating a relationship between input light power and a noise figure for the optical amplification repeater 41 of each stage is stored in a memory, etc., not shown in the calculator 58 in advance, and then by referring to the table, a determination is made on a value of a noise figure corresponding to input light power (total power of WDM light) to the optical-amplification repeating node 4 of each stage, which is included in the output information from the OSC receiver 57. In this regard, if a same kind of product is applied to the optical amplification repeater 41 of each stage, the calculator 58 ought to have a common table for each stage.

Next, in the calculator 58, an amount of adjustment of the reception level for each channel of WDM light at the receiving-end side OADM node 5B is calculated using a transmission line loss of each repeater span and a calculation result of a noise figure of the optical amplification repeater 41. It is possible to calculate the amount of adjustment, for example, using a relationship shown by the following Expression (1).

$$OSNRrec_m = -10 \cdot \log [OSNR(NF_1, L_1, \Delta P_m)^{-1} + OSNR(NF_2, L_2, \Delta P_m)^{-1} + \ldots + OSNR(NF_n, L_n, \Delta P_m)^{-1}] \quad (1)$$

Note that $OSNRrec_m$ in Expression (1) represents a received OSNR (unit: dB) of the m-th channel of WDM light that has reached the OADM node 5B. $NF_n$ represents a noise figure (unit: dB) of the n-th optical amplification repeater 41. $L_n$ represents a transmission line loss (unit: dB) of the n-th repeater span. $\Delta P_m$ represents an amount of adjustment of the reception level (unit: dB) of the m-th channel in the OADM node 5B. OSNR (NF$_n$, L$_n$, $\Delta P_m$) represents a function of calculating a received OSNR using a noise figure NF$_n$, a transmission line loss L$_n$, and an amount of adjustment $\Delta P_m$ of a reception level as variables.

Further, the reciprocal of each term in the right-side log in the above-described Expression (1), that is to say, a value of OSNR (NF$_k$, L$_k$, $\Delta P_k$) indicating the m-th channel OSNR (antilogarithm) output from the k-stage optical-amplification repeating node 4 can be calculated in accordance with a relationship shown by the following Expression (2) assuming that k is a positive number between 1 to n. 10·log [OSNR (NF$_k$, L$_k$, $\Delta P_k$)]=P$_{in}$−L$_k$+$\Delta Pt_m$·k/n−$\Delta P_m$−NF$_k$−10·log [h·v] . . . (2) Note that P$_{in}$ in the above-described Expression (2) represents optical power (unit: dBm) of the m-th channel input into the optical transmission line 3 of the k-th repeater span. $\Delta Pt_m$ represents a difference (unit: dB) between an average value of the reception levels of individual channels that have reached at receiving-end side OADM node 5B and a reception level of the m-th channel when WDM light having a same power level of each channel is transmitted from the transmission-end side OADM node 5A. In this regard, h is the Planck constant, and v is a frequency corresponding to the m-th channel wavelength.

That is to say, the calculator 58 calculates a value of $\Delta P_m$ for each channel in accordance with a predetermined calculation algorithm using relationships in the above-described Expression (1) and Expression (2) such that OSNRrec$_m$ in Expression (1) becomes greatest. And a calculation result (an amount of adjustment $\Delta P$ of the reception level) corresponding to each channel is transmitted to the level adjuster 54 in the transmission-end side OADM node 5A as the control signal CS. In this regard, OSNRrec$_m$ in Expression (1) becomes greatest here. However, if a value of $\Delta P_m$ is selected so that OSNRrec$_m$ increases from a current state, it is possible to improve transmission performance of WDM light in the corresponding section.

The level adjuster 54 independently adjusts a power level corresponding to each channel of the optical add/drop multiplexer 51 in the transmission-end side OADM node 5A in accordance with the control signal CS from the calculator 58 such that the reception level of each channel in the receiving-end side OADM node 5B changes by the amount of adjustment $\Delta P$. That is to say, feedback control is performed on a power level of each channel of the WDM light transmitted onto the optical transmission line 3 from the transmission-end side OADM node 5A such that a received OSNRrec of each channel in the receiving-end side OADM node 5B becomes greatest. This feedback control is repeatedly performed until the reception level of each channel in the receiving-end side OADM node 5B converges to a desired and/or necessary error range.

Figure 5:
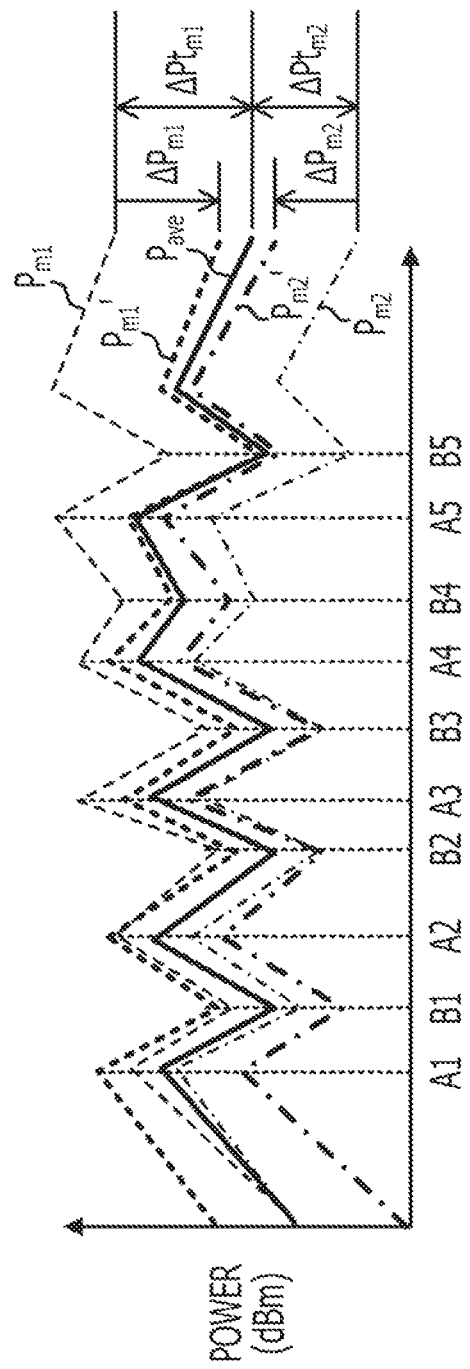
FIG. 5 is a diagram illustrating an example of level deviations among WDM light channels in each position of the section in FIG. 4.

FIG. 5 is a diagram illustrating an example of level deviations among WDM light channels in each position of the unit section having the individual OADM nodes 5A and 5B as both ends.

In the example in FIG. 5, a level diagram P$_{m1}$ denoted by a thin broken line, and a level diagram P$_{m2}$ denoted by a thin chain-dotted line show a state in which WDM light having a same power level of each channel has been transmitted from the transmission-end side OADM node 5A at the beginning of the above-described feedback control. A large level deviation ($\Delta Pt_{m1}$, $\Delta Pt_{m2}$) between the channels occur on the WDM light that has reached the receiving-end side OADM node 5B because of accumulation of the wavelength deviations that have occurred at the post amplifier 52, the individual optical amplification repeaters 41 and the preamplifier 55. In this initial state, the average value of power levels of individual channels corresponds to a level diagram P$_{ave}$ denoted by a bold solid line in the figure.

And the power level of each channel transmitted from the transmission-end side OADM node 5A is subjected to the feedback control in accordance with the amount of adjustment $\Delta P$ of the reception level calculated by the calculator 58 for each channel. Thereby, the level diagram P$_{m1}$ in the initial state changes to a level diagram P$_{m1}$' denoted by a bold broken line in the figure, and the level diagram P$_{m2}$ in the initial state changes to a level diagram P$_{m2}$' denoted by a bold chain-dotted line in the figure. In a state in which the above-described feedback control has converged within the desired and/or necessary error range, that is to say, in a state in which the received OSNRrec of each channel at the receiving-end side OADM node 5B becomes greatest, the level deviations among channels of the WDM light reaching the OADM node 5B are remarkably reduced compared with the initial state ($\Delta P_{m1}$, $\Delta P_{m2}$). By such optimum control on the level diagrams, transmission performance of WDM light that is repeated-transmitted between the two adjacent OADM nodes 5A and 5B is maximized.

In the WDM optical transmission system (FIG. 3) according to the present embodiment, the feedback control of the transmission power level of WDM light, as described above, is performed in the section having the transmission terminal station 1 and the OADM node 5 of the uppermost stream as both ends, the individual sections having two adjacent OADM nodes 5 as both ends, and the section having the OADM node 5 of the lowermost stream and the receiving terminal station 2 as both ends. Thereby, it is possible to reduce level deviations among channels of WDM light by a simple and low-cost configuration without the need for applying an expensive optical analyzer to the individual sections. Accordingly, it becomes possible to easily maximize transmission performance of WDM light throughout the entire system.

Figure 6:
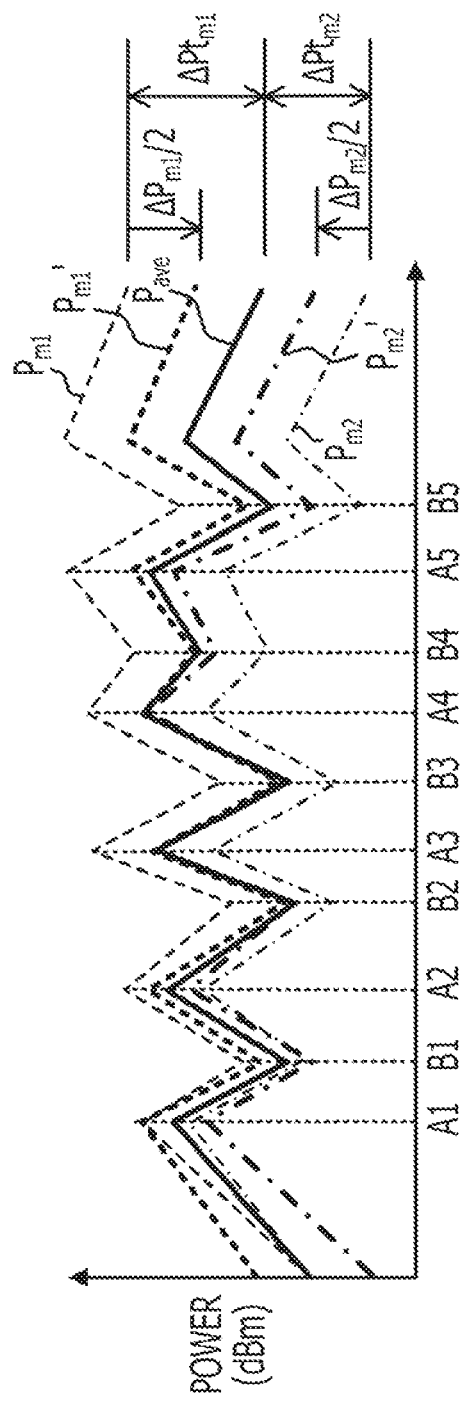
FIG. 6 is a diagram illustrating an example of level deviations among channels in an application related to the embodiment.

In this regard, in the above-described embodiment, an example is shown of the case where the calculator 58 performs feedback control of transmission optical power by calculating an amount of adjustment $\Delta P_m$ of the reception level such that OSNRrec$_m$ in Expression (1) becomes greatest. However, for example, under a system condition that a length of each repeater span in the unit section of the feedback control becomes substantially equal, the amount of adjustment $\Delta P_m$ may be determined such that a value of the difference $\Delta Pt_m$ becomes half the average value of the reception levels in the initial state (the state in which WDM light having a same power level of each channel is transmitted from the transmission-end side OADM node 5A). That is to say, the amount of adjustment of the reception level of the m-th channel may be set as $\Delta P_m = \Delta Pt_m/2$. In this case, FIG. 6 illustrates an example of level deviations among channels of WDM light at each position in the unit section shown in FIG. 4. By determining the amount of adjustment of the reception level of each channel as described above, under the condition that the length of each repeater span is substantially equal, the calculation processing in the calculator 58 can be simplified. Accordingly, it becomes possible to achieve high-speed feedback control.

Next, a description will be given of a WDM optical transmission system according to another embodiment of the present invention.

Figure 7:
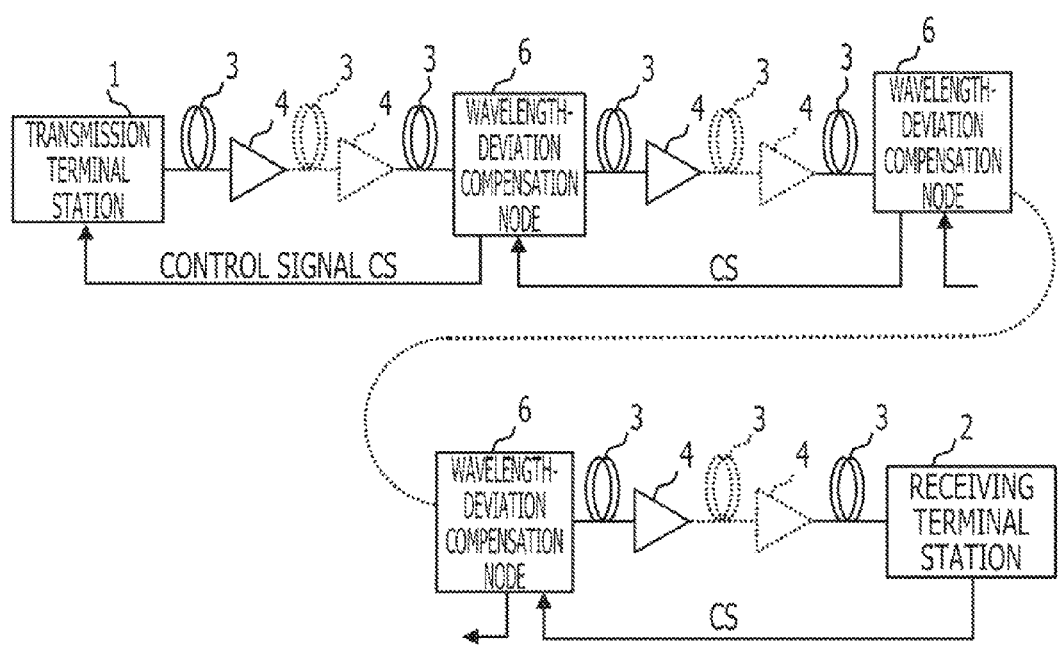
FIG. 7 is a block diagram illustrating an overall configuration of a WDM optical transmission system according to another embodiment of the present invention.

FIG. 7 is a block diagram illustrating an overall configuration of a WDM optical transmission system according to another embodiment.

In FIG. 7, a WDM optical transmission system according to the present embodiment includes, for example, a plurality of wavelength-deviation compensation nodes 6 using a dynamic gain equalizer (DGE) on an optical transmission line 3 connecting a transmission terminal station 1 and a receiving terminal station 2 as optical nodes having a function of independently adjusting a power level corresponding to each channel of WDM light. In this WDM optical transmission system, a power level corresponding to each channel of WDM light is individually optimized in a section connecting a transmission terminal station 1 and a wavelength-deviation compensation node 6 positioned at uppermost stream among a plurality of wavelength-deviation compensation nodes 6, individual sections connecting two adjacent wavelength-deviation compensation nodes 6 among the plurality of wavelength-deviation compensation nodes 6, and a section connecting a wavelength-deviation compensation node 6 positioned at lowermost stream among the plurality of wavelength-deviation compensation nodes 6 and a receiving terminal station 2.

Figure 8:
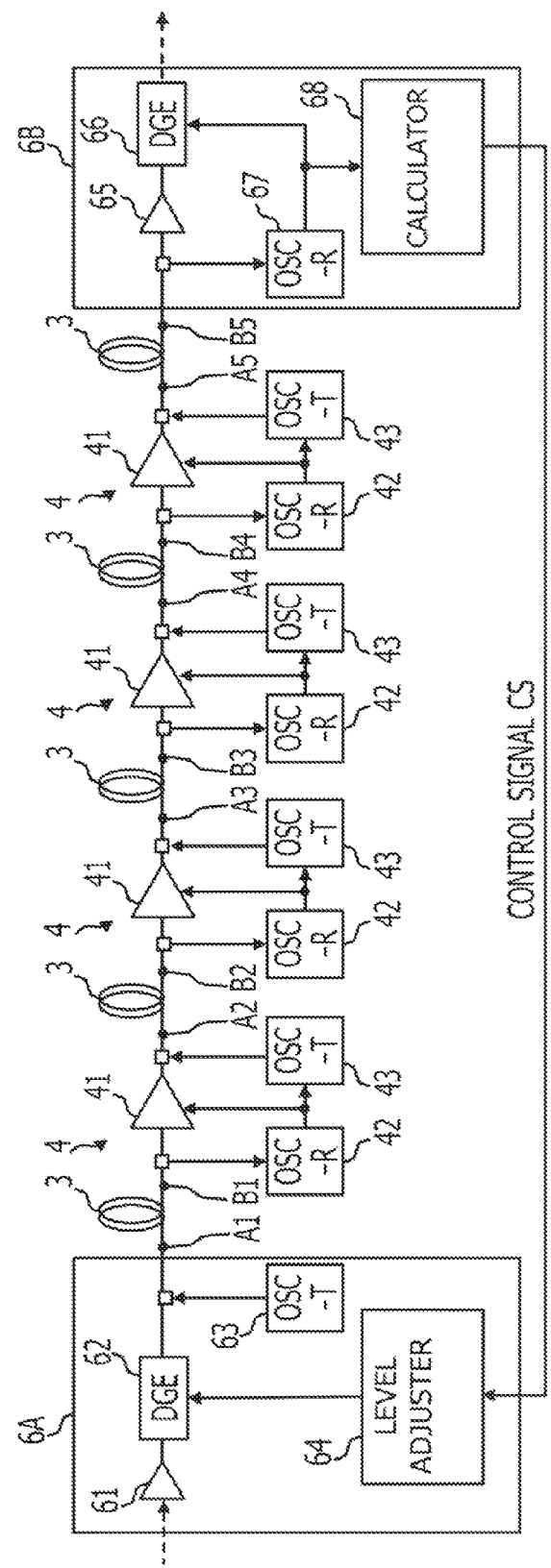
FIG. 8 is a block diagram illustrating an enlarged configuration of a section connecting two adjacent wavelength-deviation compensation nodes in the other embodiment.

FIG. 8 is a block diagram illustrating an enlarged configuration of a section connecting two adjacent wavelength-deviation compensation nodes 6 as a specific example of a unit section in which the above-described power-level optimization is performed.

In the example of a configuration in FIG. 8, a wavelength-deviation compensation node 6A positioned at the transmission end of the section includes an optical amplifier 61, a dynamic gain equalizer (DGE) 62, an OSC transmitter (OSC-T) 63, and a level adjuster 64. Also, a wavelength-deviation compensation node 6B positioned at the receiving end of the section includes an optical amplifier 65, a dynamic gain equalizer (DGE) 66, an OSC receiver (OSC-R) 67, and a calculator 68.

Each of the above-described optical amplifiers 61 and 65 are general optical amplifiers capable of amplifying input WDM light to a desired and/or necessary level all together. The dynamic gain equalizers 62 and 66 are publicly-known optical devices which have a variable transmissive wavelength characteristic, and are capable of independently adjusting a power level corresponding to each channel of WDM light output from the optical amplifiers 61 and 65, respectively. Here, the transmissive wavelength characteristic of the dynamic gain equalizer 62 in the transmission-end side wavelength-deviation compensation node 6A is subjected to feedback control by the level adjuster 64. In this regard, configurations of the OSC transmitter 63 in the wavelength-deviation compensation node 6A, the OSC receiver 67 of the wavelength-deviation compensation node 6B, and each optical-amplification repeating node 4 are the same as those in the above-described case shown in FIG. 4, and thus the descriptions thereof will be omitted here.

In the WDM optical transmission system having the above-described configuration, same operation effects can be obtained as in the cases described with reference to FIGS. 3 to 5. That is to say, the calculator 68 in the receiving-end side wavelength-deviation compensation node 6B calculates level deviations among channels that are to be given to WDM light in the wavelength-deviation compensation node 6B on the basis of the transmission information from the individual upstream nodes obtained by the OSC receiver 67. And the level adjuster 64 in the transmission-end side wavelength-deviation compensation node 6A performs feedback control on the transmissive wavelength characteristic of the dynamic gain equalizer 62 in accordance with the control signal CS indicating the calculation result. Thereby, transmission performance of the WDM light, which is repeated-transmitted among the two adjacent wavelength-deviation compensation nodes 6A and 6B, is maximized.

In this regard, in the above-described WDM optical transmission system according to each embodiment, a description has been given of the case in which a plurality of either one of the OADM nodes 5 or the wavelength-deviation compensation nodes 6 are disposed on the optical transmission line 3 connecting the transmission terminal station 1 and the receiving terminal station 2. However, the present invention is also effective in a system configuration mixedly including the OADM nodes 5 and the wavelength-deviation compensation nodes 6 on the optical transmission line 3. Also, the example of a configuration in which a plurality of optical-amplification repeating nodes 4 is disposed on the optical transmission line 3 in a unit section of feedback control. However, it is possible to reduce level deviations among channels of the WDM light transmitted through the unit section, and to maximize transmission performance even by a configuration in which only one optical-amplification repeating node 4 is disposed. Further, the OADM may include a DOADM (Dynamic Optical Add Drop Multiplexer), an ROADM (Reconfigurable Optical Add Drop Multiplexer), etc., and may include an OXC (Optical Cross-connect) in addition.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A WDM optical transmission system comprising:
  a plurality of optical add/drop multiplexer nodes optically coupled by a transmission line; and
  a first processor and a second processor provided with two adjacent optical add/drop multiplexer nodes respectively among the plurality of optical add/drop multiplexer nodes, wherein
  the first processor is operative to control a power level corresponding to each channel of WDM light for a unit section between the two adjacent add/drop multiplexer nodes, and
  the second processor is operative to calculate an amount of adjustment of a reception level capable of increasing an optical signal-to-noise ratio for each channel of the WDM light reaching the optical add/drop multiplexer node positioned at a receiving end of the unit section based on information on amplification operation of the WDM light in at least one optical-amplification repeating node disposed on the optical transmission line in the unit section, and to adjust a power level corresponding to each channel of the WDM light transmitted on the transmission line from the optical add/drop multiplexer node positioned at a transmission end of the unit section in accordance with a calculation result calculated by the second processor.

2. The WDM optical transmission system according to claim 1,
  wherein the second processor is operative to obtain monitor information of total power of the WDM light individually input and output for n-stage optical amplification repeating nodes disposed on the optical transmission line in the unit section, calculates individual transmission line losses $L_1$ to $L_n$ of a first to an n-th repeater spans and individual noise figures $NF_1$ to $NF_n$ in the first to the n-th stage optical-amplification repeating nodes using the monitor information, and further, calculates a value of $\Delta P_m$ for each channel such that $OSNRrec_m$ becomes greatest in a following relational expression:

$$OSNRrec_m = -10 \cdot \log [OSNR(NF_1, L_1, \Delta P_m)^{-1} + OSNR(NF_2, L_2, \Delta P_m)^{-1} + \ldots + OSNR(NF_n, L_n, \Delta P_m)^{-1}]$$

where $OSNRrec_m$ denotes an optical signal-to-noise ratio of a m-th channel of the WDM light reaching the optical add/drop multiplexer node positioned at the receiving end of the unit section, $\Delta P_m$ denotes an amount of adjustment of the reception level, and $OSNR(NF_k, L_k, \Delta P_m)$ denotes a function representing an optical signal-to-noise ratio of the m-th channel of an optical-amplification repeating node in a k-th stage (k=1 to n).

3. The WDM optical transmission system according to claim 2,
wherein the second processor is operative to obtain monitor information on total power of the WDM light individually input from and output to an n-stage optical amplification repeating nodes using an optical supervisory channel signal transferred between individual nodes in the unit section.

4. The WDM optical transmission system according to claim 1,
wherein the plurality of optical add/drop multiplexer nodes include a dynamic gain equalizer.

5. The WDM optical transmission system according to claim 4,
wherein the optical add/drop multiplexer node includes a wavelength selective switch to independently adjust a power level corresponding to each channel of the WDM light.

6. The WDM optical transmission system according to claim 4,
wherein the optical add/drop multiplexer node includes a variable optical attenuator disposed for each channel of the WDM light to independently adjust a power level corresponding to each channel of the WDM light.

7. The WDM optical transmission system according to claim 1,
wherein the plurality of optical add/drop multiplexer nodes include a wavelength-deviation compensation node.

8. The WDM optical transmission system according to claim 7,
wherein the wavelength-deviation compensation node includes a dynamic gain equalizer to independently adjust a power level corresponding to each channel of the WDM light.

9. The WDM optical transmission system according to claim 8,
wherein the plurality of optical add/drop multiplexer nodes include a transmission terminal station and a receiving terminal station.

10. The WDM optical transmission system according to claim 1,
wherein the second processor is operative to determine the amount of adjustment of the reception level for each channel such that when each repeater span length in the unit section is substantially equal, a difference value of the reception level of an individual channel becomes half an average value of the reception levels of individual channels at the optical add/drop multiplexer node positioned at the receiving end of the unit section in an initial state in which the WDM light having a same power level of each channel is transmitted from the optical add/drop multiplexer node positioned at the transmission end of the unit section.

11. A method of controlling a WDM optical transmission system including a plurality of optical add/drop multiplexer nodes having a function of independently adjusting a power level corresponding to each channel of the WDM light, the method comprising:
setting a section coupling two adjacent optical add/drop multiplexer nodes including a first processor and a second processor among the plurality of optical add/drop multiplexer nodes as a unit section for control;
controlling, by the first processor, a power level corresponding to each channel of the WDM light for each of the unit section;
individually calculating, by the second processor, an amount of adjustment of a reception level capable of increasing an optical signal-to-noise ratio for each channel of the WDM light reaching the optical add/drop multiplexer node positioned at a receiving end of the unit section based on information on amplification operation of the WDM light in at least one optical-amplification repeating node disposed on the optical transmission line in the unit section; and
adjusting, by the first processor, a power level corresponding to each channel of the WDM light transmitted on the transmission line from the optical add/drop multiplexer node positioned at a transmission end of the unit section in accordance with the calculated amount of adjustment of the reception level for each channel.

* * * * *